Feb. 14, 1939.  LA VERNE R. PHILPOTT  2,146,761
REGULATION OF DIRECT CURRENT
Filed Dec. 9, 1936  2 Sheets-Sheet 1

INVENTOR
LaVerne R. Philpott
BY
Robert A. Lavender
ATTORNEY

INVENTOR
LaVerne R. Philpott
BY
Robert A. Levenski
ATTORNEY

Patented Feb. 14, 1939

2,146,761

UNITED STATES PATENT OFFICE 2,146,761

REGULATION OF DIRECT CURRENT

La Verne R. Philpott, Washington, D. C.

Application December 9, 1936, Serial No. 114,917

15 Claims. (Cl. 171—312)

(Granted under the act of March 3, 1883, as amended April 30, 1928; 370 O. G. 757)

This invention relates to apparatus for and a method of maintaining the current constant in a direct current circuit regardless of changes in the impressed voltage.

Broadly stated, it is the object of this invention to maintain the current constant, within very close limits, in a direct current circuit wherein the voltage varies, by automatically changing the impedance of a network associated with such circuit.

It is very necessary to keep the current through certain direct current apparatus at a constant value, particularly when such apparatus is being utilized to supply energy to measuring devices, such as to an electromagnet serving as a source of magnetic flux where the results would be of no value or misleading if the direct current were permitted to change in strength. The underlying principle of my invention will first be made clear by reference to some very elementary circuits.

Figure 1:
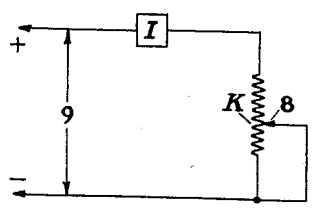
Fig. 1 shows diagrammatically a very simple method of maintaining a direct current at a constant value.
Figure 4:
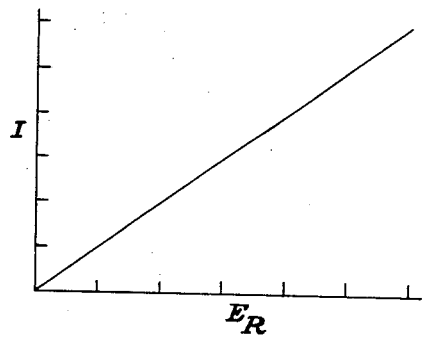
Fig. 4 is a graph showing the relation between voltage and current.

Fig. 1 shows a simple resistance R of a value controlled by the sliding or tap contact 8 across a source of direct voltage 9. It is evident that the value of I is dependent upon the voltage of 9 and the value of R, and changes when the value of either of these is altered. The current in this circuit may be varied by changing the position of tap 8 on resistance R or the line current I may be maintained constant when the voltage of source 9 varies by manipulation of tap contact 8. This is shown in Fig. 4 wherein the change in current is plotted against the change in voltage.

Figure 2:
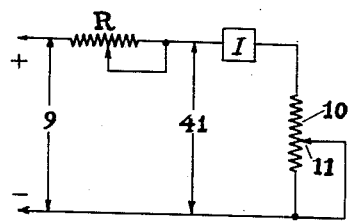
Fig. 2 is also diagrammatic and illustrates a somewhat more complicated method of attaining the result set forth.

Fig. 2 shows a second resistance 10 in series with resistance R, the effective value of the former being variable at will by changing the position of the sliding contact 11 and thus the line current I may be held steady even though the impressed voltage changes. It is apparent that the voltage across resistance 10 will have the same value as between the points designated by the line 41 and that this voltage will be less than that of source 9 by a quantity equal to the drop through resistance R. If we represent the voltage of source 9 by $E_L$ and represent time by $t$, the variation in the effective value of resistance 10 to make the equation $$\frac{dI}{dt} = 0$$

is $$\frac{dR_0}{dE_L} = \frac{R + R_0}{E_L}$$

wherein R is the value of resistance R, and $R_0$ is the value of resistance 10.

Figure 3:
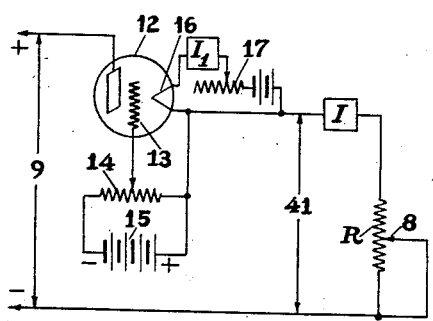
Fig. 3 illustrates the use of a vacuum tube whereof the impedance may be varied manually to effect regulation of the current.

In Fig. 3 the voltage across R is controlled by varying the impedance of a vacuum tube 12 that is connected in series with the load resistance R. Suitable initial values for passing the required current may be set up by varying the bias on grid 13 of tube 12 through a change in the point of connection thereof to voltage divider 14 that is connected in series with battery 15 and also by changing the current through filament 16 of tube 12 by altering the resistance 17 in the filament circuit thereof and the current thereafter may be held constant by appropriate changes of grid voltage. This device is manually adjusted and does not respond automatically to changes in voltage of source 9.

Figure 5:
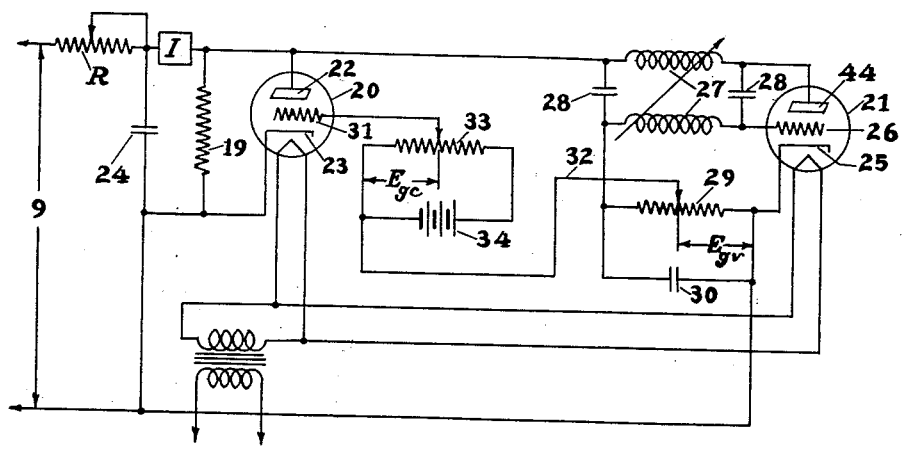
Fig. 5 shows schematically a network embodying the principle of my invention associated with a direct current circuit.

Fig. 5 shows a network for applying the principles of my invention to the automatic regulation of a direct current. This network comprises a resistance 19, a vacuum tube 20 and a vacuum tube 21 in parallel with each other and in series with the load R. The tube 20 has its plate 22 connected to the negative side of the load and its cathode 23 connected to the negative lead, the resistance 19 being connected between the plate and the cathode of tube 20. A by-pass condenser 24 is connected across the output circuit of the tube 20. Plate 44 and cathode 25 of tube 21 are likewise respectively connected to the negative side of the load circuit and the negative lead, the grid 26 of tube 21 being connected to plate 44 by a suitable oscillatory network, shown in Fig. 5, as consisting of the variably coupled inductances 27 and condensers 28. The grid-cathode circuit of tube 21 includes a resistance 29 and a condenser 30 in parallel with each other. The grid 31 of tube 20 is connected to the resistance 29 through a lead 32 and a resistance 33, the resistance 33 being in series with battery 34 and the connection of resistance 33 to grid 31 being variable to apply to grid 31, a voltage of desired value to shift the point about which the voltage of grid 31 will fluctuate due to voltage changes across resistance 29 caused by variations in the plate current of tube 21. It is evident that an increase in the voltage impressed on plate 44 will result in a greater flow of current through resistance 29 and this will have the effect of decreasing the voltage on grid 31 and thereby increase the impedance of tube 20. The constant voltage impressed on grid 31 by battery 34 is designated $E_{gc}$ while the variable voltage from the oscillator 21 is designated $E_{gv}$.

Figure 6:
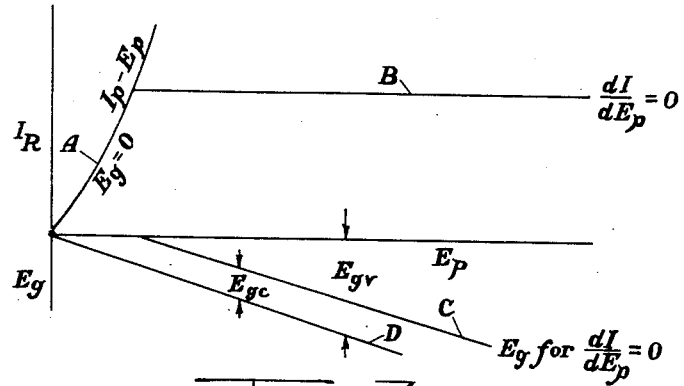
Fig. 6 shows graphically the relations between the plate current, the plate voltage and the grid voltage to keep the current output constant.

The operation of the apparatus shown in Fig. 5 may be explained by reference to the graph of Fig. 6 wherein the current through the load resistance R is plotted along the positive ordinate, the grid voltage of tube 20 is plotted on the negative ordinate and the positive abscissa represents the plate voltage, these three quantities being represented for convenience by $I_R$, $E_g$, and $E_p$, respectively. The curve A shows the plate current of tube 20 plotted against the plate voltage with grid voltage zero. Suppose it is desired to maintain a steady direct current having value represented by a line B, it is apparent that the grid voltage must not go to zero but must have a minimum value represented by the abscissa of the point of intersection of line B with curve A and that the value of the grid voltage must progressively decrease as the plate voltage increases to prevent change in the current through the tube. The line D in Fig. 6 shows the value of the voltage impressed on grid 31 of tube 20 due to changes in the output current of tube 21 and the consequent variation in the voltage across resistance 29. The line C in Fig. 6 shows the resultant or net voltage applied to grid 31 by the connection to resistance 29 and also by the voltage divider resistance 33, the value of the steady voltage derived from battery 34 being equal to the ordinate distance between equal abscissa values on the lines C and D and is opposed to the voltage derived from oscillator 21 to shift the abscissa of the initial point of line C to the same value as the abscissa of the intersection of line B with curve A. This makes the regulation of the current independent of the load resistance R.

Figure 7:
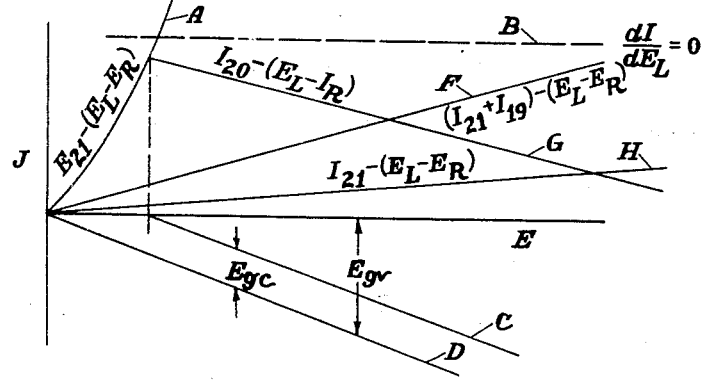
Fig. 7 is a graphic representation of the current and voltage relations in a network embodying the principle of my invention when the current through the regulated circuit is held at a uniform value.

In Fig. 7 the curve A' is the current through tube 20 plotted against the voltage across the parallel connected elements 19, 20 and 21, that is, it is the line voltage less the drop through resistance R plotted against the current through tube 20 at zero grid bias. The lines B, C and D represent the same quantities as in Fig. 6 but, as above stated, the line E represents the effective voltage across the parallel connection elements and the line I represents the current. Line F shows the sum of the currents through tube 21 and resistance 19 plotted against the effective voltage E and line G shows the relation between current through tube 20 and the same voltage. It will be noted that the slopes of lines F and G are opposite in sense but of equal value and therefore the resultant total current is constant as represented by line B. Within the capacity range of tube 20 the current through the load resistance R is thus seen to be independent both of the line voltage and of the magnitude of the load resistance. Any ripple in the voltage on the supply line can be filtered out by making resistance 29, condenser 30, the inductances 27, and condenser 28 of suitable values.

Figure 8:
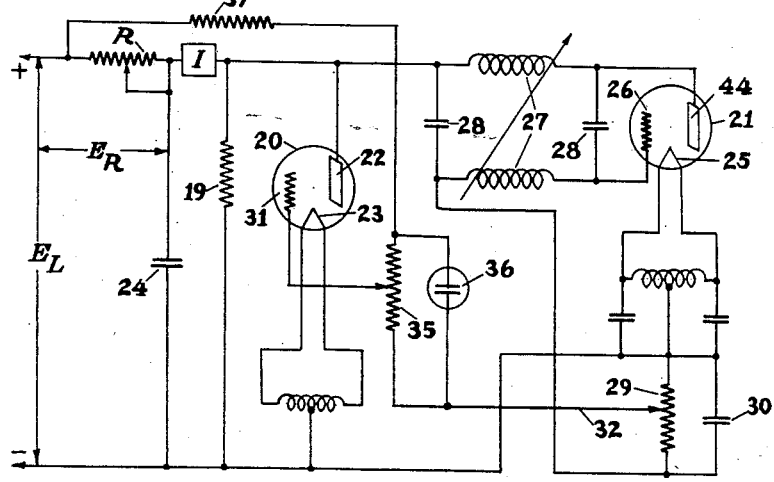
Fig. 8 illustrates a modified embodiment of my invention.

The circuit of Fig. 8 is substantially the same as that in Fig. 5 except that the battery 34, which supplies the constant voltage to grid 31, is replaced by a resistance 35 in parallel with a gas tube 36 and in series with a resistance 37 connected to the positive supply line, the variations in the voltage across resistance 35 being eliminated by the change in current through gas tube 36 in response to such changes. The tube 36 forms a very satisfactory substitute for battery 34 when resistances 35 and 37 have high values.

As a specific example, the present invention was applied to regulate the current through an electromagnet having a resistance of 2200 ohms, requiring 104 milliamperes. Referring to Fig. 5, the several elements had the following values:

| | |
|---|---|
| Resistance 19 | 5000 ohms. |
| Tube 20 | Type 2A3. |
| Tube 21 | Type '46. |
| Battery 34 | 22½ volt "C" battery. |
| 27, 28 | Set for 500 kilocycles. |
| Condenser 24 | 4 mf. |

Using a meter capable of reading current at 100 milliamperes accurate to $\frac{2}{10}$ milliampere, the system was adjusted to cover a range of input voltage from 100–118 volts at the 60 cycle supply line feeding a rectifier that directly supplied $E_L$ without perceptible change of current. As the magnet warmed up and its resistance changed approximately 10 percent no current change could be detected when the change was in the range of the regulator. When direct heated tubes were used, and adjustments made so that $$\frac{dI}{dE_L}=0$$

a transient in the voltage caused a more slight transient in I, while a permanent shift of voltage if sufficiently sudden would cause a slight transient in I that would disappear as soon as the filaments reached the new temperature equilibrium. When a battery or a well regulated line was used to supply the filaments of the tubes, no transients appeared in I for any cause, nor was there any permanent change in I with changing $E_L$.

The invention herein described and claimed may be used and/or manufactured by or for the Government of the United States of America for governmental purposes without the payment of any royalties thereon or therefor.

I claim:

1. The combination with the positive and negative leads of a direct current supply system and a device constituting a load for said system, of a capacitance connected between the low voltage side of said load and said negative lead; a triode having a grid, an anode, and a cathode with said anode connected to said low voltage side and said cathode connected to said negative lead; a first resistance connected between said cathode and said anode, an oscillatory network connected to said low voltage side; a vacuum tube having a grid, an anode and a cathode, the grid and the anode thereof being operatively connected to said network and the cathode thereof being connected to said negative lead; a capacitance and a second resistance connected in parallel between said cathode and said network, means variably connecting a point on said second resistance to the grid of said triode to apply thereto a negative bias proportional to the output current of said vacuum tube, said means including a variable resistance, and a source of potential connected across said variable resistance to apply to the grid of said triode a steady potential to set at a predetermined position the point about which said triode operates.

2. The combination with the positive and negative leads of a direct current supply system and a device constituting a load for said system, of a capacitance connected between the low voltage side of said load and said negative lead; a triode having a grid, an anode and a cathode with said anode connected to said low voltage side and said cathode connected to said negative lead; a first resistance connected between said cathode and said anode, an oscillatory network connected to said low voltage side; a vacuum tube having a grid, an anode and a cathode, the grid and the anode thereof being operatively connected to said network and the cathode thereof being connected to said negative lead; means to impress a constant voltage upon the grid of said triode, and means to impress upon the grid of said triode a voltage that is increasingly negative in proportion to any increase of current in the output of said vacuum tube.

3. The combination with the positive and negative leads of a direct current supply system and a device constituting a load for said system, of a capacitance connected between the low voltage side of said load and said negative lead; a triode having a grid, an anode and a cathode with said anode connected to said low voltage side and said cathode connected to said negative lead; a first resistance connected between said cathode and said anode, an oscillatory network connected to said low voltage side; a vacuum tube having a grid, an anode and a cathode, the grid and the anode thereof being operatively connected to said network and the cathode thereof being connected to said negative lead; means to impress a constant voltage upon the grid of said triode, and means responsive to changes in the current in said positive lead to vary the voltage on the grid of said triode to oppose such changes.

4. The combination with the positive and negative leads of a direct current supply system and a device constituting a load for said system, of a capacitance connected between the low voltage side of said load and said negative lead; a triode having a grid, an anode and a cathode with said anode connected to said low voltage side and said cathode connected to said negative lead; a first resistance connected between said cathode and said anode, an oscillatory network connected to said low voltage side; a vacuum tube having a grid, an anode and a cathode, the grid and the anode thereof being operatively connected to said network and the cathode thereof being connected to said negative lead; means to impress a constant voltage upon the grid of said triode, and means responsive to changes in the electrical conditions in said line to vary the impedance of said triode to oppose such changes.

5. The combination with the positive and negative leads of a direct current supply system and a device constituting a load for said system, of a capacitance connected between the low voltage side of said load and said negative lead; a resistance, a triode, and a vacuum tube connected in series with said load and in parallel with each other; the plates and cathodes of said triode and said vacuum tube being so connected in the system that each plate is at a higher potential than is the respectively cooperating cathode, said resistance being connected between the anode and the cathode of said triode; elements constituting an oscillatory network associating the grid and the plate of said vacuum tube, a first resistance and a capacity in parallel operatively connected between the cathode of said tube and said network, means including a second resistance variably connecting a point on said first resistance to the grid of said triode to impress on the grid thereof a potential to vary the negative bias on the grid of said triode proportionately to the output current of said vacuum tube, and means associated with said second resistance to apply a constant potential to the grid of said triode.

6. The combination with the positive and negative leads of a direct current supply system and a device constituting a load for said system, of a capacitance connected between the low voltage side of said load and said negative lead; a constant impedance, a variable impedance, and a vacuum tube connected in parallel with each other and in series with said load, the plate of said tube being at higher potential than the cathode thereof; an oscillatory network connecting the grid and the plate of said tube, means to set the impedance of said variable impedance at a predetermined value, and means associated with said tube connected to vary the said impedance to oppose changes in the current supplied to said load.

7. The combination with the positive and negative leads of a direct current supply system and a device constituting a load for said system, of a capacitance connected between the low voltage side of said load and said negative lead; a constant impedance, a variable impedance, and means constituting a third current path, said impedances and said means being all connected in parallel with each other and in series with said load, said means being responsive to changes in current through said load and so associated with said impedance as to vary said impedance to oppose the said changes in current.

8. The combination with a device constituting a load in a direct current system, of a resistance, a triode, and a vacuum tube connected in series with said load and in parallel with each other; the plates and cathodes of said triode and said vacuum tube being so connected in the system that each plate is at higher potential than is the respectively cooperating cathode, said resistance being connected between the anode and the cathode of said triode; elements constituting an oscillatory network associating the grid and the plate of said vacuum tube, a first resistance and a capacity in parallel operatively connected between the cathode of said tube and said network, means including a second resistance variably connecting a point on said first resistance to the grid of said triode to impress on the grid thereof a potential to vary the negative bias on the grid of said triode proportionately to the output current of said vacuum tube, and means associated with said second resistance to apply a constant potential to the grid of said triode.

9. The combination with a device constituting a load in a direct current system, of a constant impedance, a variable impedance, and a vacuum tube connected in parallel with each other and in series with said load, the plate of said tube being at higher potential than the cathode thereof; an oscillatory network connecting the grid and the plate of said tube, means to set the impedance of said variable impedance at a predetermined value, and means associated with said tube connected to vary the said impedance to oppose changes in the current supplied to said load.

10. The combination with a device constituting a load in a direct current system, of a constant impedance, a variable impedance, and means constituting a third current path, said impedances and said means being all connected in parallel with each other and in series with said load, said means being responsive to incipient changes in current through said load and so associated with said impedance as to vary said impedance to oppose the said changes in current.

11. The combination with the positive and negative leads of a direct current supply system and a device constituting a load for said system, of a capacitance connected between the low voltage side of said load and said negative lead; a triode having a grid, an anode and a cathode with said anode connected to said low voltage side and said cathode connected to said negative lead; a first resistance connected between said cathode and said anode, an oscillatory network connected to said low voltage side; a vacuum tube having a grid, an anode and a cathode, the grid and the anode thereof being operatively connected to said network and the cathode thereof being connected to said negative lead; a capacitance and a second resistance connected in parallel between said cathode and said network, means variably connecting a point on said second resistance to the grid of said triode to apply thereto a negative bias proportional to the output current of said vacuum tube, said means including variable resistance, a third resistance connected to said positive lead and in series with said variable resistance, and a gas tube connected in parallel with said variable resistance.

12. The combination with the positive and negative leads of a direct current supply system and a device constituting a load for said system, of a capacitance connected between the low voltage side of said load and said negative lead; a triode having a grid, an anode and a cathode with said anode connected to said low voltage side and said cathode connected to said negative lead; a first resistance connected between said cathode and said anode, an oscillatory network connected to said low voltage side; a vacuum tube having a grid, an anode and a cathode, the grid and the anode thereof being operatively connected to said network and the cathode thereof being connected to said negative lead; a capacitance and a second resistance connected in parallel between said cathode and said network, means variably connecting a point on said second resistance to the grid of said triode to apply thereto a negative bias proportional to the output current of said vacuum tube, said means including variable resistance, and a device deriving current from said positive lead connected across said variable resistance to apply to the grid of said triode a steady potential to shift to a predetermined position the point about which said triode operates.

13. The combination with a device constituting a load in a direct current system, of a resistance, a triode, and a vacuum tube connected in series with said load and in parallel with each other; the plates and cathodes of said triode and said vacuum tube being so connected in the system that each plate is at a higher potential than is the respectively cooperating cathode, said resistance being connected between the grid and the cathode of said triode, elements constituting an oscillatory network associating the grid and the plate of said vacuum tube, a first resistance and a capacity in parallel operatively connected between the cathode of said tube and said network, means including a second resistance variably connecting a point on said first resistance to the grid of said triode to impress on the grid thereof a potential to vary the negative bias on the grid of said triode proportionately to the output current of said vacuum tube, and means associated with said second resistance to apply a constant potential to the grid of said triode, said means including a resistance connected to the positive lead of said system and in series with said second resistance and also including a gas tube connected in parallel with said second resistance.

14. The combination with a device constituting a load in a direct current system, of a constant impedance, a variable impedance, and a vacuum tube connected in parallel with each other and in series with said load, the plate of said tube being at higher potential than the cathode thereof; an oscillatory network connecting the grid and the plate of said tube, current carrying means deriving current from the positive lead of said system operatively associated with the said variable impedance to set the impedance thereof at a predetermined value, and means associated with said tube operatively connected to vary the impedance of said variable impedance to oppose changes in current supplied to said load.

15. The combination with a device constituting a load in a direct current system, of a constant impedance, a variable impedance, and a second impedance whereof the value automatically varies in response to changes in the voltage impressed thereon, all said impedances being connected in parallel with each other and in series with said load, the current through said second impedance rising or falling in conformity with rise or fall of the voltage impressed thereon, current carrying means deriving current from said second impedance to vary the impedance of said variable impedance to oppose changes in the current applied to said load, and means to set the impedance of said variable impedance at a predetermined value.

LA VERNE R. PHILPOTT.